United States Patent
Lin

(10) Patent No.: US 9,030,414 B2
(45) Date of Patent: May 12, 2015

(54) METHOD OF DYNAMICALLY ADJUSTING IMAGE FRAME RATE AND DEVICE USING SAME

(71) Applicant: Chun-Huang Lin, HsinChu (TW)

(72) Inventor: Chun-Huang Lin, HsinChu (TW)

(73) Assignee: Chip Goal Electronics Corporation, Hsinchu (TW)

( * ) Notice: Subject to any disclaimer, the term of this patent is extended or adjusted under 35 U.S.C. 154(b) by 191 days.

(21) Appl. No.: 13/860,033

(22) Filed: Apr. 10, 2013

(65) Prior Publication Data

US 2014/0306892 A1 Oct. 16, 2014

(51) Int. Cl.
| | |
|---|---|
| *G06F 3/0338* | (2013.01) |
| *G06F 3/033* | (2013.01) |
| *G09G 5/22* | (2006.01) |
| *G06F 3/038* | (2013.01) |

(52) U.S. Cl.
CPC . *G09G 5/22* (2013.01); *G06F 3/038* (2013.01)

(58) Field of Classification Search
CPC ........ G06F 3/033; G06F 3/038; G06F 3/0338
USPC .......................... 345/156, 159, 3.2
See application file for complete search history.

(56) References Cited

U.S. PATENT DOCUMENTS

| | | | |
|---|---|---|---|
| 2009/0195505 A1* | 8/2009 | Chen et al. ............... | 345/166 |
| 2013/0113759 A1* | 5/2013 | Gu et al. ................... | 345/175 |
| 2013/0249800 A1* | 9/2013 | Chung et al. ............. | 345/166 |
| 2014/0022168 A1* | 1/2014 | Kao et al. ................. | 345/157 |
| 2014/0118399 A1* | 5/2014 | Todorovich et al. ...... | 345/634 |

* cited by examiner

*Primary Examiner* — Ricardo L Osorio
(74) *Attorney, Agent, or Firm* — Tung & Associates

(57) ABSTRACT

The invention provides a method for dynamically adjusting image frame rate, which includes: sequentially obtaining plural displacements; accumulating a count of the displacement is sequentially higher than a first threshold value, to increase an image frame rate if the count is larger than a first reference value; and accumulating a count of the displacement is sequentially lower than a second threshold value, to reduce the image frame rate if the accumulated count is larger than a second reference value.

22 Claims, 6 Drawing Sheets

METHOD OF DYNAMICALLY ADJUSTING IMAGE FRAME RATE AND DEVICE USING SAME

BACKGROUND OF THE INVENTION

1. Field of Invention

The present invention relates to a method of dynamically adjusting an image frame rate, especially a method of dynamically adjusting an image frame rate according to a sensed displacement or a usage time of a reference block. A device using the method is also disclosed by the present invention.

2. Description of Related Art

Image sensing devices are often used in electronic devices such as remote controller, computer mouse, etc. In image sensing operation, image frame rate is a key factor which affects the sensing accuracy and power consumption. When the image frame rate is relatively higher, the sensing accuracy is relatively better but the power consumption is relatively higher. When the image frame rate is relatively lower, the power consumption is relatively lower but the sensing accuracy is relatively lower. Therefore, it is better for the image frame rate to be adjustable so that the needs for sensing accuracy and power consumption can both be met.

One prior art method adjusts the image frame rate by comparing a speed of the image sensing device with a threshold value. The speed is calculated by a calculating unit according to displacements and the image frame rate of the image sensing device. This prior art requires complex calculation and the mechanism to determine whether to adjust the image frame rate is also very complex. Further, the threshold value to be compared with the speed is predetermined, but the motion of a sensed object is usually random, so the predetermined threshold value is often not the best setting.

In view of the aforementioned drawback of the prior art, the present invention discloses a method of dynamically adjusting an image frame rate according to the sensed displacement or the usage time of a reference block, which can improve the overall calculation efficiency, achieving both good sensing accuracy and low power consumption without complicated calculation and complex mechanism for judgment.

SUMMARY OF THE INVENTION

From a perspective of the present invention, a method of dynamically adjusting image frame rate is provided and the method includes: (A) obtaining a displacement; (B) comparing the displacement with a first threshold value; when the displacement is higher than the first threshold value, accumulating a first count of a number of times that the displacement is higher than the first threshold value; and increasing an image frame rate in a first scale when the first count is larger than a first reference value; and (C) comparing the displacement with a second threshold value; when the displacement is lower than the second threshold value, accumulating a second count of a number of times that the displacement is lower than the second threshold value; and reducing the image frame rate in a second scale when the second count is larger than a second reference value, wherein the step (B) and the step (C) are performed in any order or in parallel with each other.

In a preferable embodiment of the present invention, the method further includes: repeating the step (A) through the step (C).

In a preferable embodiment of the present invention, the method includes: not adjusting the image frame rate when the displacement is between the first threshold value and the second threshold value, wherein the first threshold value is higher than the second threshold value.

In a preferable embodiment of the present invention, the method further includes: not increasing the image frame rate when the image frame rate reaches an upper limit; or not reducing the image frame rate when the image frame rate reaches a lower limit.

In a preferable embodiment of the present invention, the method further includes: resetting the first count of the step (B) to zero when the displacement is not higher than the first threshold value; or resetting the second count of the step (C) to zero when the displacement is not lower than the second threshold value.

In another preferable embodiment of the present invention, the method further includes: comparing the displacement with a third threshold value; when the displacement is higher than the third threshold value, accumulating a third count of a number of times that the displacement is higher than the third threshold value; and increasing the image frame rate in a third scale when the third count is larger than a third reference value, wherein the third threshold value is lower than the first threshold value and the third scale is lower than the first scale.

In another preferable embodiment of the present invention, the method further includes: comparing the displacement with a fourth threshold value; when the displacement is lower than the fourth threshold value, accumulating a fourth count of a number of times that the displacement is lower than the fourth threshold value; and reducing the image frame rate in a fourth scale when the fourth count is larger than a fourth reference value, wherein the fourth threshold value is higher than the second threshold value and the fourth scale is lower than the second scale.

From another perspective of the present invention, a device for dynamically adjusting image frame rate is provided and the device includes: a displacement calculation unit, for sequentially receiving a plurality of images and calculating a plurality of displacements according to the images; an image frame rate adjusting unit, for receiving the displacements and generating an image frame rate adjustment signal according to the steps of the aforementioned method; and a memory unit, for storing at least one of the following data: the displacements, the accumulated counts, the threshold values, and the reference values.

From another perspective of the present invention, a method of dynamically adjusting image frame rate is provided and the method includes: (A) obtaining a usage time of a reference block, wherein the reference block is used for comparison with an image to determine a displacement; (B) comparing the usage time with a first threshold time value; when the usage time is higher than the first threshold time value, accumulating a first count of a number of times that the usage time is higher than the first threshold time value; and reducing an image frame rate in a first scale when the first count is larger than a first criterion value; and (C) comparing the usage time with a second threshold time value; when the usage time is lower than the second threshold time value, accumulating a second count of a number of times that the usage time is lower than the second threshold time value; and increasing the image frame rate in a second scale when the second count is larger than a second criterion value, wherein the step (B) and the step (C) are performed in any order or in parallel with each other.

In a preferable embodiment of the present invention, the method can further include: repeating from the step (A) through the step (C).

In another preferable embodiment of the present invention, the method further includes: not adjusting the image frame rate when the usage time is between the first threshold time value and the second threshold time value, wherein the first threshold time value is higher than the second threshold time value.

In another preferable embodiment of the present invention, the method further includes: not increasing the image frame rate when the image frame rate reaches an upper limit; or not reducing the image frame rate when the image frame rate reaches a lower limit.

In another preferable embodiment of the present invention, the method further includes: resetting the first count of the step (B) to zero when the usage time is not higher than the first threshold time value; or resetting the second count of the step (C) to zero when the usage time is not lower than the second threshold value.

In another preferable embodiment of the present invention, the method further includes: comparing the usage time with a third threshold time value; when the usage time is higher than the third threshold time value, accumulating a third count of a number of times that the usage time is higher than the third threshold time value; and reducing the image frame rate in a third scale when the third count is larger than a third criterion value, wherein the third threshold time value is lower than the first threshold time value and the third scale is lower than the first scale.

In another preferable embodiment of the present invention, the method further includes: comparing the usage time with a fourth threshold time value; when the usage time is lower than the fourth threshold time value, accumulating a fourth count of a number of times that the usage time is lower than the fourth threshold time value; and increasing the image frame rate in a fourth scale when the fourth count is larger than a fourth criterion value, wherein the fourth threshold time value is higher than the second threshold value and the fourth scale is lower than the second scale.

From another perspective of the present invention a device for dynamically adjusting image frame rate is provided and the device includes: a usage time counting unit, for counting a usage time of a reference block, wherein the reference block is used for comparison with an image to determine a displacement; an image frame rate adjusting unit, for receiving the usage time and generating an image frame rate adjustment signal according to the steps of the aforementioned method; and a memory unit, for storing at least one of the following data: the usage time, the accumulated counts, the threshold time values, and the criterion values.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, but not drawn according to actual scale. The orientation wordings in the description such as: above, under, left, or right are for reference with respect to the drawings, but not for limiting the actual product made according to the present invention.

Figure 1A:
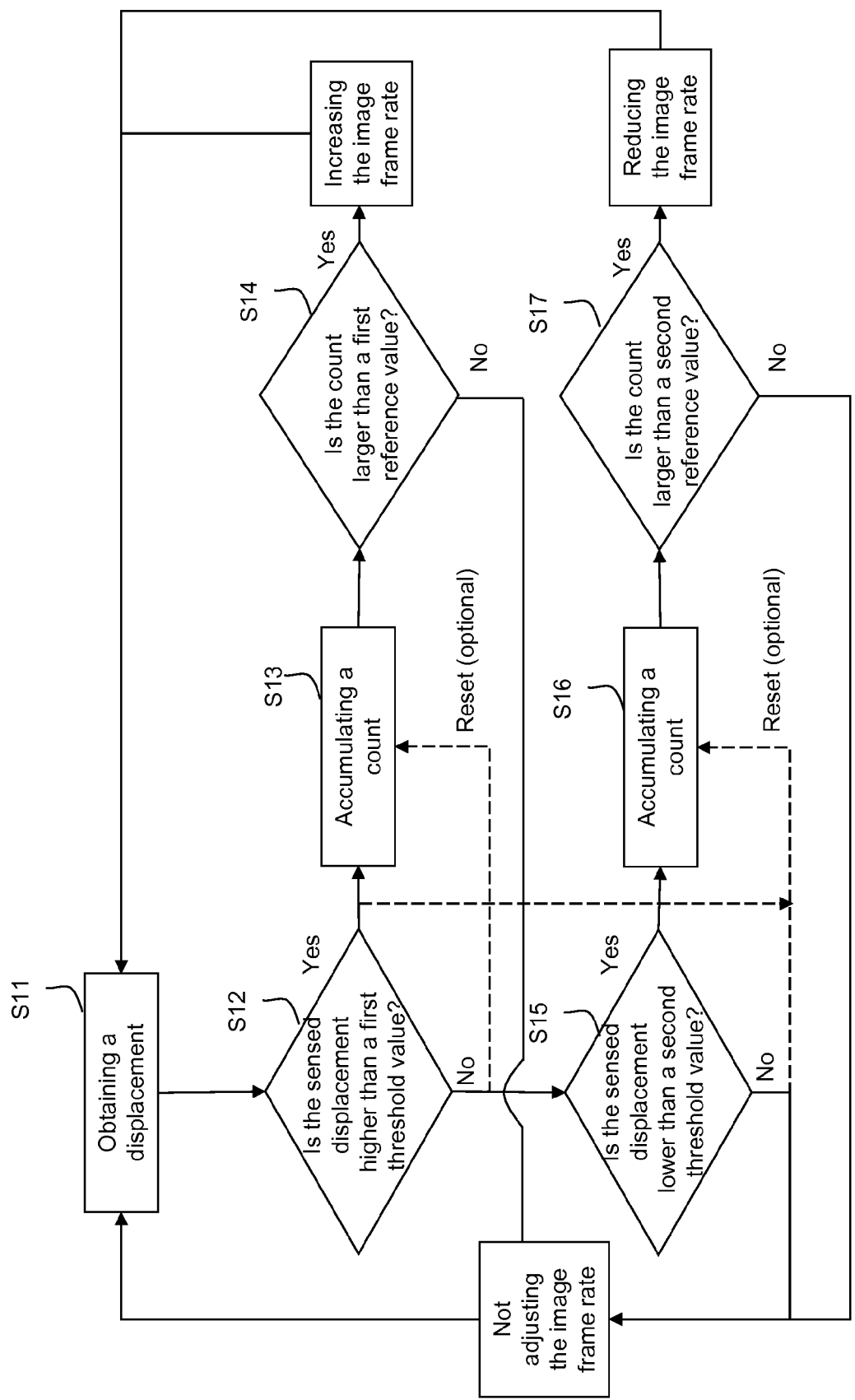
FIGS. 1A and 1B show two preferable embodiments of the method of dynamically adjusting the image frame rate according to the present invention.

FIG. 1A shows a flow chart of a first embodiment of the method of dynamically adjusting the image frame rate according to the present invention. The method includes the following steps. First, a displacement is obtained (S11). The displacement is compared with a first threshold value (S12), and when the displacement is higher than the first threshold value, a count is accumulated by 1; the count indicates a number of times that the displacement is higher than the first threshold value (S13) (and optionally, the count accumulated in step S16 can be reset to zero, as shown by the dash line in the figure). If the accumulated count is larger than a first reference value (S14), the image frame rate is increased, and the flow goes back to step S11 to receive the next displacement. When the displacement is not higher than the first threshold value, in one embodiment, the accumulated count in step S13 can be reset to zero; in another embodiment, the accumulated count in step S13 remains. And, the displacement is compared with a second threshold value (S15). When the displacement is lower than the second threshold value, a count is accumulated by 1; the count indicates a number of times that the displacement is lower than the second threshold value (S16) (That is, the count accumulated in step S16 is a different count from the count accumulated in step S13). If the count is larger than a second reference value (S17), the image frame rate is reduced, and the flow goes back to step S11 to receive the next displacement. When the displacement is not lower than the second threshold value, in one embodiment, the accumulated count in step S16 can be reset to zero; in another embodiment, the accumulated count in step S16 remains. When the judgment of step S14 or S17 is no, the image frame rate is not adjusted, and the flow goes back to step S11 to receive the next displacement. The displacement represents a motion of a target object, which is obtained by comparing two sensed images, or by comparing a reference block and the current image. A larger displacement means that the target object moves faster, and the image frame rate can be increased to more precisely track the motion. A smaller displacement means that the target object moves slower, and the image frame rate can be reduced for saving power.

In the present embodiment, the purpose to set the first reference value and the second reference value is to avoid misjudgment due to noise and to confirm that the faster or slower motion is stable and continuous, so that the image frame rate will not be unnecessarily adjusted. However, this is preferred but not necessary. In the basic form of the present invention, the accumulation of the counts and the comparisons between the counts and the first and second reference values can be omitted (i.e., omitting steps S13, S14, S16, and S17, or setting the first and second reference values to zero). In the embodiment wherein the first and second reference values are set to non-zero, the first and second values can be set according to the characteristics of the optical device using this method or the objective to be achieved. For example, when the displacement is larger, it means that within a shorter sensing time the target object moves a longer distance, so the first reference value can be set relatively larger than the second reference value; as an example, the first reference value can be set to 5 times and the second reference value can be set to 3 times. However, from another point of view, when the displacement is larger, it means that the image frame rate needs to be adjusted within a shorter time period, so from this point of view the first reference value can be set relatively smaller than the second reference value. In summary, the setting of the first reference value and the second reference value can be determined according to practical needs. Of course, the first reference value and the second reference value can be set the same.

The first threshold value and the second threshold value are compared with the displacement to decide whether the motion speed of the target object is faster or slower. These two threshold values are preferably different values wherein the first threshold value is higher than the second threshold value, so that when the displacement is between the first threshold value and the second threshold value, the image frame rate is not adjusted to avoid frequent adjustment of the image frame rate (FIG. 1A shows this by the block "not adjusting the image frame rate" when the judgments of steps S12 and S15 are no). However, this is preferred but not necessary; the first threshold value and the second threshold value can be set the same, and in this case when the judgment of step S15 is no, the flow can go back to step S12.

It should be noted that the flow chart shown in FIG. 1A is for illustrative purpose, and the order of the steps does not necessarily have to be exactly as shown. For example, step S15 is not necessarily performed after the judgment of step S12 is no. That is, the judgment of step S15 can be done before step S12, and step S12 is performed after the judgment of step S15 is no; or, step S15 and step S12 can be performed in parallel.

Furthermore, every optical device has its specific operation range, so the image frame rate should preferably have an upper limit and a lower limit which are determined according to the characteristics of the optical device which uses the present invention. That is, when the flow goes to a step which calls for an adjustment of the image frame rate, but the adjustment will cause the image frame rate to fall out of the specific operation range, then the image frame rate is not adjusted. This concept is same as used in later embodiments.

Figure 1B:
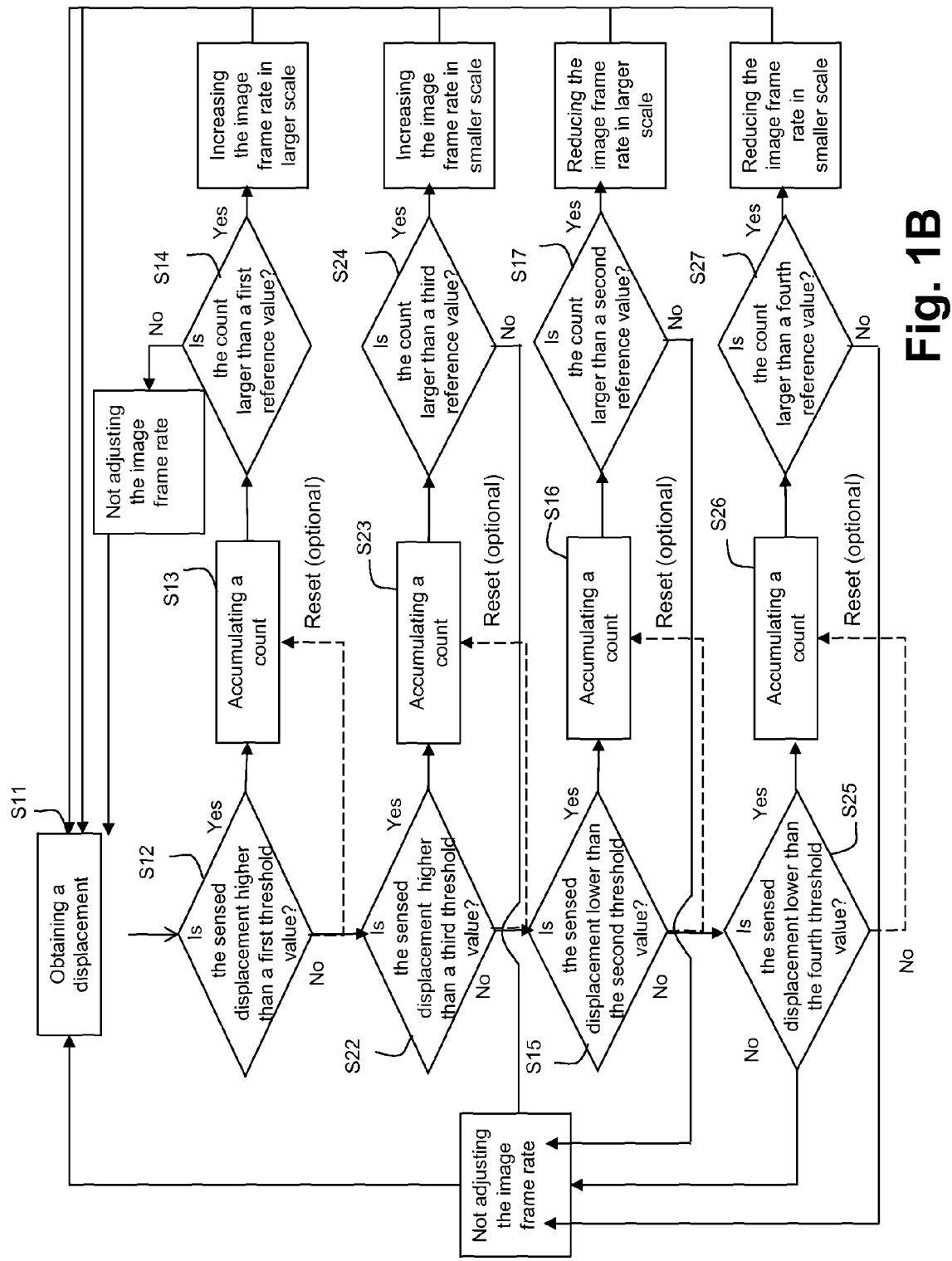

FIG. 1B shows another preferable embodiment of method of dynamically adjusting image frame rate according to the present invention. Compared with FIG. 1A, the method of FIG. 1B further includes the following steps: comparing the displacement with a third threshold value (S22); if the displacement is higher than the third threshold value, accumulating a count of the number of times that the displacements is higher than the third threshold value (S23); and increasing the image frame rate if the count is larger than a third reference value (S24), wherein the third threshold value is lower than the first threshold value. The concept of the above arrangement is thus: when the displacement is higher than the first threshold value, it means that the target object moves very fast and the image frame rate can be increased in a larger scale. When the displacement is lower than the first threshold value but higher than the second threshold value, it means that the target object moves relatively faster but not very fast, and the image frame rate can be increased in a smaller scale.

Step S22 is not necessarily performed after the judgment of step S12 is no; step S22 can be performed prior to step S12, and step S12 can be performed after the judgment of step 22 is yes, or step S12 and step S22 can be performed in parallel. In the embodiment wherein step S12 and step S22 are performed in parallel, the accumulated count of step 23 for example can be reset to zero after the judgment of step S12 is yes; or, the first reference value can be set lower than the third reference value, and respectively accumulating the counts of the number of times that the displacement is higher than the first threshold value and the third threshold value. When the accumulated count in step S13 is larger than the first reference value before the accumulated count in step S23 is larger the third reference value, the image frame rate is increased in the larger scale.

Still referring to FIG. 1B, the method of dynamically adjusting image frame rate shown therein further includes: comparing the displacement with a fourth threshold value (S25); accumulating a count of the number of times that the displacement is lower than the fourth threshold value (S26); and reducing the image frame rate if the count is larger than a fourth reference value (S27), wherein the fourth threshold value is higher than the second threshold value. The concept of the above arrangement is thus: when the displacement is lower than the second threshold value, it means that the target object moves very slowly and the image frame rate can be reduced in a larger scale; when the displacement is higher than the second threshold value but lower than the fourth threshold value, it means that the target object moves relatively slower but not very slowly, and the image frame rate can be reduced in a smaller scale. Please note that the counts accumulated in steps S13, S16, S23 and S26 are four different counts.

Similarly, step S25 is not necessarily performed after the judgment of step S15 is no; step S25 can be performed prior to step S15, and step S15 can be performed after the judgment of the step 25 is yes, or steps S15 and S25 can be performed in parallel. In the embodiment wherein steps S15 and S25 are performed in parallel, for example, the accumulated count of step S26 can be reset to zero after the judgment of step S15 is yes, or, the second reference value can be set lower than the fourth reference value.

For details of the rest part of FIG. 1B (such as the optional reset and the return to step S11, etc.), please refer to the description of FIG. 1A, and they are not redundantly repeated here.

Figure 2A:
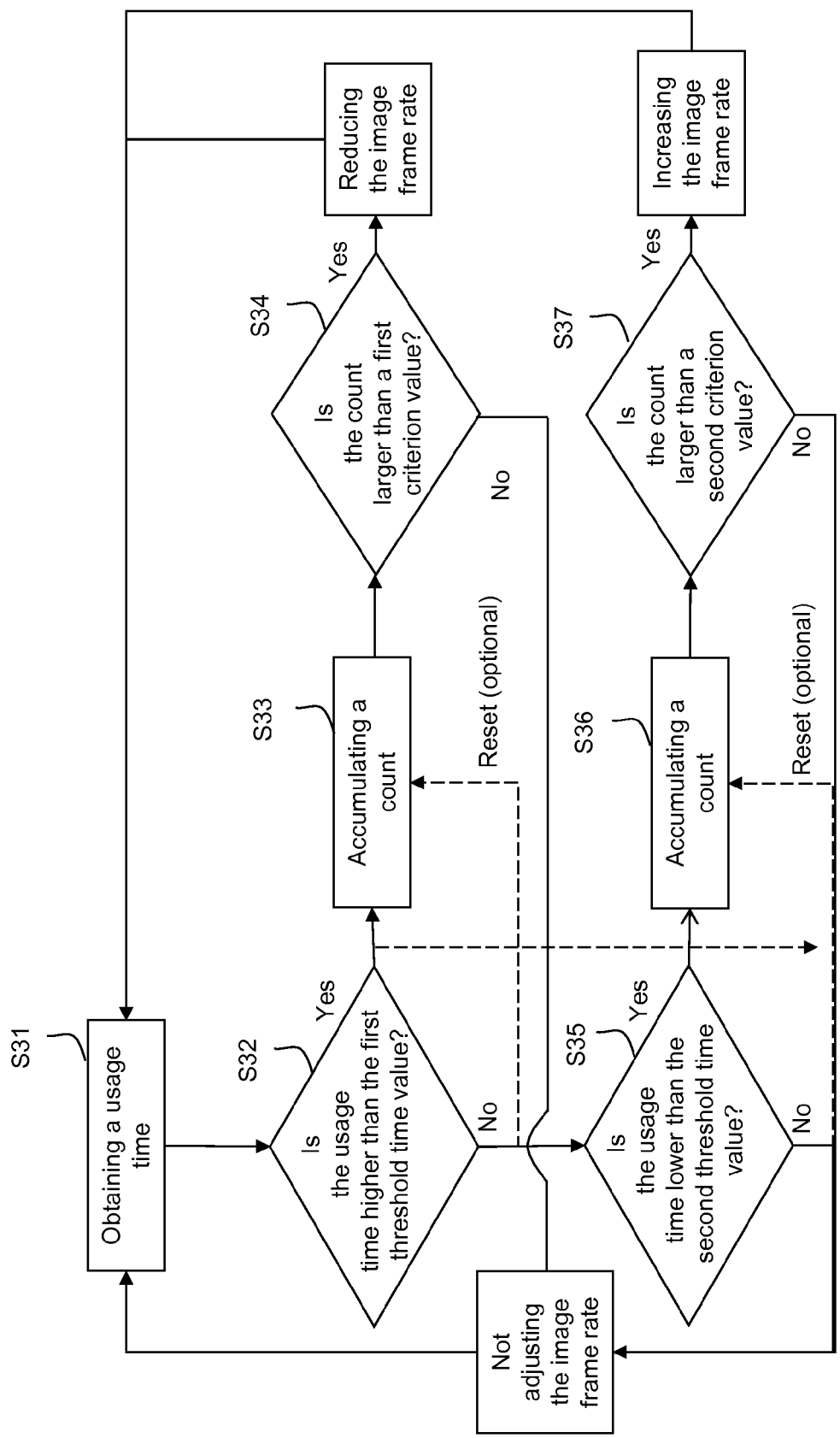
FIGS. 2A and 2B show two other preferable embodiments of the method of dynamically adjusting the image frame rate according to the present invention.

FIG. 2A shows another preferable embodiment of the method of dynamically adjusting image frame rate according to the present invention. Among the displacement calculation methods, one method uses a reference block obtained from a sensed image and compares the reference block with the current image to determine a displacement. The reference block is used to compare with new images until the reference block is obsolete and a new reference block is obtained (for example, from the most current image). The method of FIG. 2A adjusts the image frame rate according to a usage time of the reference block, which includes the following steps: obtaining a usage time of a reference block (S31); comparing the usage time with a first threshold time value (S32); when the usage time is higher than the first threshold time value, accumulating a count of a number of times that the usage time is higher than the first threshold time value (S33) (optionally, the accumulated count of step S36 can be simultaneously reset to zero, as shown by the dash line in the figure); reducing the image frame rate if the count is larger than a first criterion value (S34); and obtaining a next usage time (going back to step S31). When the usage time is not higher than the first threshold time value, in one embodiment, the accumulated count of step S33 can be reset to zero; in another embodiment, the accumulated count of step S33 remains and is not reset to zero. Moreover, the method also includes the steps of: comparing the usage time with a second threshold time value (S35); when the usage time is lower than the second threshold time value, accumulating a count of a number of times that the usage time is lower than the second threshold time value (S36); and increasing the image frame rate if the count is larger than a second criterion value (S37). Next, the flow goes back to step S31 to obtain a next usage time. When the usage time is not lower than the second threshold time value, in one embodiment, the accumulated count of step S36 can be reset to zero ; in another embodiment, the accumulated count of step S36 remains and is not reset to zero. When the judgment of step S34 or S37 is no, the image frame rate is not adjusted and the flow goes back to step S31 to obtain a next usage time.

The concept of the above arrangement is thus: when the usage time is longer (that is, the same reference block is used for a relatively longer time and does not required to be updated), it means the target object moves slower and the image frame rate can be reduced to reduce calculation and power consumption; when the usage time is shorter (that is, the reference block is updated frequently), it means the target object moves faster and the image frame rate can be increased to accelerate the calculation for better tracking the target object. The first threshold time value and the second threshold time value can be the same or not the same. If the first threshold time value and the second threshold time value are not the same, the first threshold time value can be set higher than the second threshold time value, and the image frame rate is not adjusted if the usage time is between the first threshold time value and the second threshold time value; if they are the same, the flow can go back to step S32 after the judgment of step S35 is no. Furthermore, the first criterion value and the second criterion value can be set to the same value or different values; the factors to determine their settings are similar to the factors to determine the settings of the first reference value and the second reference value in the embodiment of FIG. 1A.

It should be noted that the flow chart of FIG. 2A is for illustrative purpose, and the order of the steps does not necessarily have to be exactly as shown. For example, step S35 is not necessarily performed after the judgment of step S32 is no; step S35 can be performed before step S32, and step S32 can be performed after the judgment of step S35 is no. Or, the steps S32 and S35 can be performed in parallel.

Figure 2B:
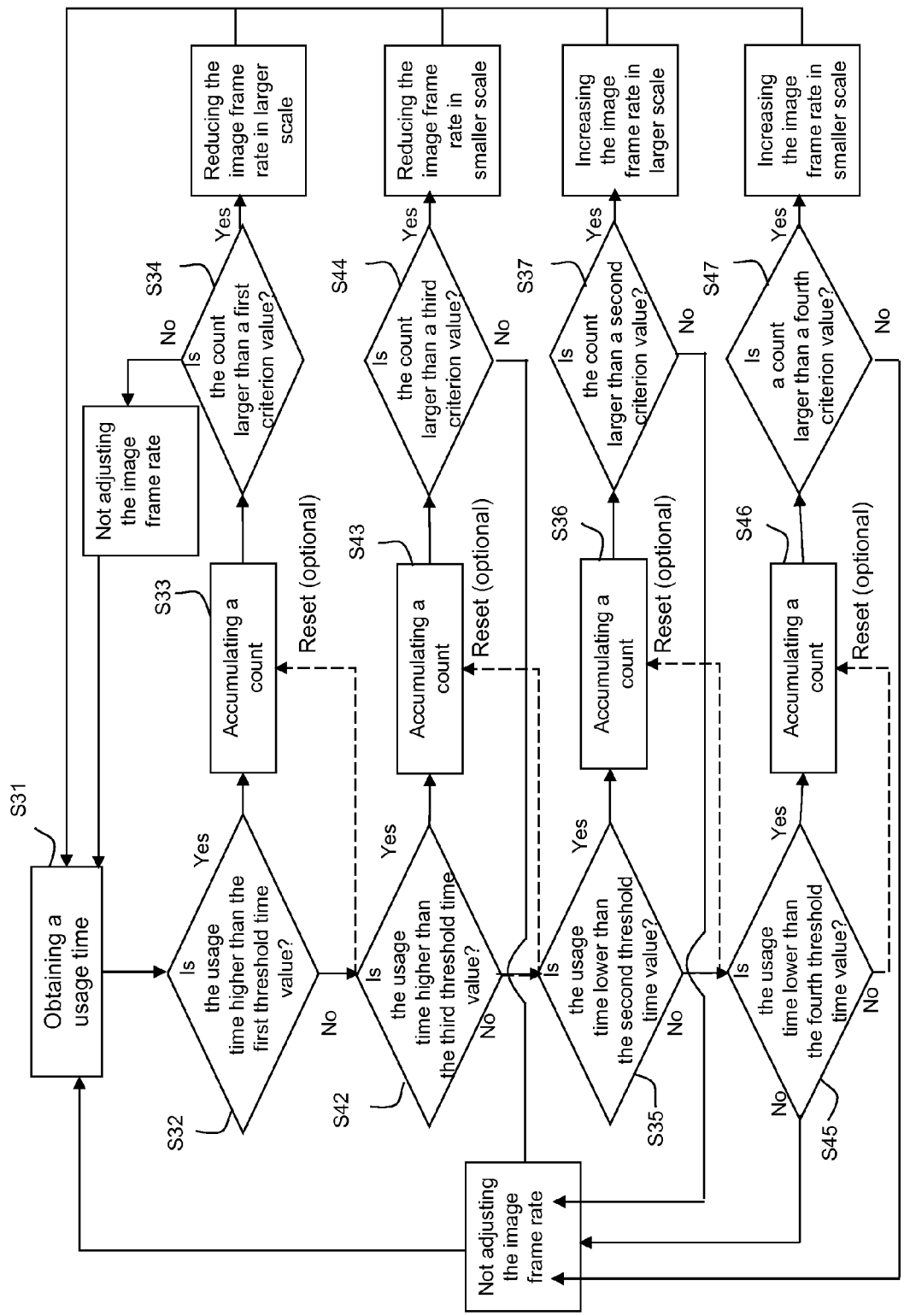

FIG. 2B shows another embodiment of the method of dynamically adjusting image frame rate according to the present invention. Compared with FIG. 2A, the embodiment of FIG. 2B further includes the steps of: comparing the usage time with a third threshold time value (S42); when the usage time is higher than the third threshold time value, accumulating a count of a number of times that the usage time is higher than the third threshold time value (S43); and reducing an image frame rate in a smaller scale if the count is larger than a third criterion value (S44). The third threshold time value is lower than the first threshold time value. The concept of the above arrangement is thus: when the usage time is higher than the first threshold time value, it means the target object moves very slowly and the image frame rate can be reduced in a larger scale; when the usage time is lower than the first threshold time value but higher than the third threshold value, it means the target object moves relatively slower but not very slowly, and the image frame rate can be reduced in a smaller scale.

Step S42 is not necessarily performed after the judgment of step S32 is no; step S42 can be performed before step S32, and step S32 can be performed after the judgment of step S42 is yes; or, the steps S32 and S42 can be performed in parallel . If the steps S32 and S42 are performed in parallel, the accumulated count of step S43 can be reset to zero after the judgment of step S32 is yes, or the first criterion value can be set lower than the third criterion value. When the usage time is higher than both the first threshold time value and the third threshold time value, both accumulated counts are incremented. When the accumulated count is larger than the first criterion value, the image frame rate is reduced in the larger scale.

Still referring to FIG. 2B, this embodiment further includes the steps of: comparing the usage time with a fourth threshold time value (S45); when the usage time is lower than the fourth threshold time value, accumulating a count of a number of times that the usage time is lower than the fourth threshold time value (S46); and increasing the image frame rate if the count is larger than a fourth criterion value (S47), wherein the fourth threshold time value is higher than the second threshold value. The concept of the above arrangement is thus: when the usage time is lower than the second threshold time value, it means the target object moves very fast and the image frame rate can be increased in a larger scale; when the usage time is higher than the second threshold time value but lower than the fourth threshold time value, it means the target object moves relatively faster but not very fast, so the image frame rate can be increased in a smaller scale.

Similarly, step S45 is not necessarily performed after the judgment of step S35 is no; step S45 can be performed prior to step 35. Step S35 can be performed after the judgment of step S45 is yes, or the steps S35 and S45 can be performed in parallel . If the steps S35 and S45 are performed in parallel, the accumulated count of step S46 can be reset to zero after the judgment of step S35 is yes, or the second criterion value can be set smaller than the fourth criterion value.

For the rest part of FIG. 2B (such as the optional reset to zero), please refer to the description of FIG. 2A for details; they are not redundantly repeated here.

Figure 3:
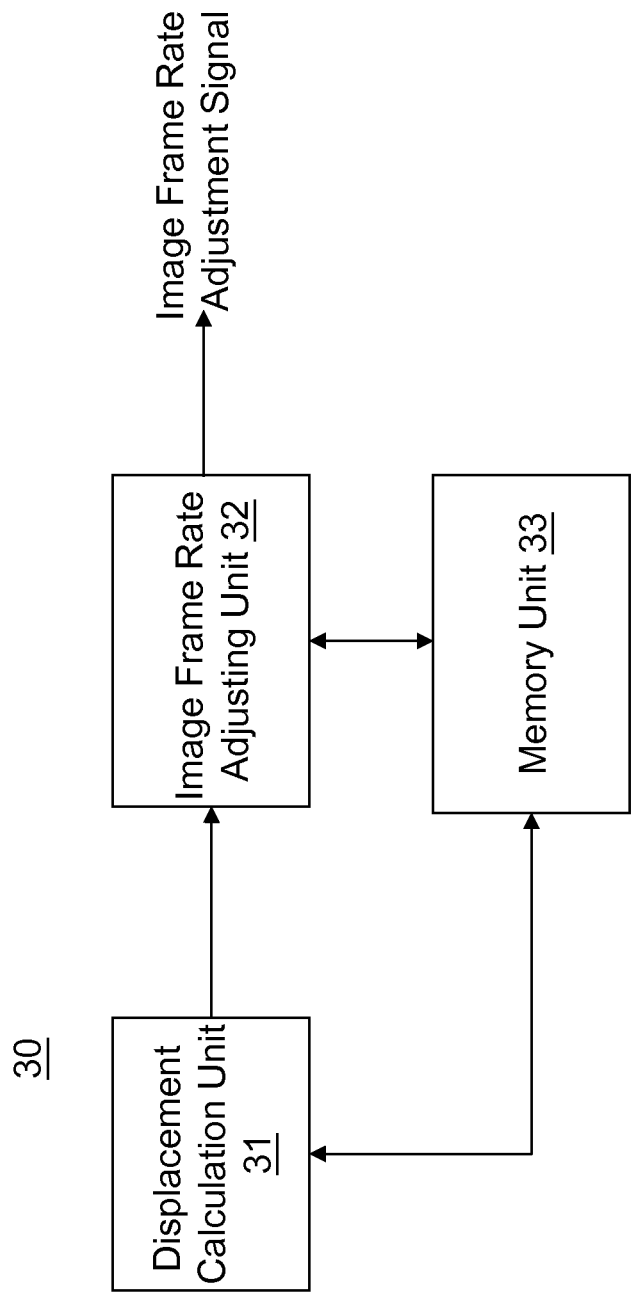
FIG. 3 shows a preferable embodiment of the device for dynamically adjusting the image frame rate according to the present invention.

Referring to FIG. 3, a device 30 for dynamically adjusting image frame rate is shown. The device 30 includes: a displacement calculation unit 31, an image frame rate adjusting unit 32, and a memory unit 33. The displacement calculation unit 31 sequentially receives plural sensed images and calculates plural corresponding displacements according to the images. The image frame rate adjusting unit 32 receives the displacements and generates an image frame rate adjustment signal according to the aforementioned steps shown in FIG. 1A or 1B, to dynamically adjust the image frame rate. The memory unit 33 stores or temporarily stores the displacements generated by the displacement calculation unit 31, and the accumulated counts, the threshold values, and/or the reference values generated or for use by the image frame rate adjusting unit 32.

In a preferred embodiment, the first threshold value is higher than the second threshold value, and when the displacement is between the first threshold value and the second threshold value, the image frame rate adjusting unit 32 does not generate the image frame rate adjustment signal and does not accumulate a count.

Figure 4:
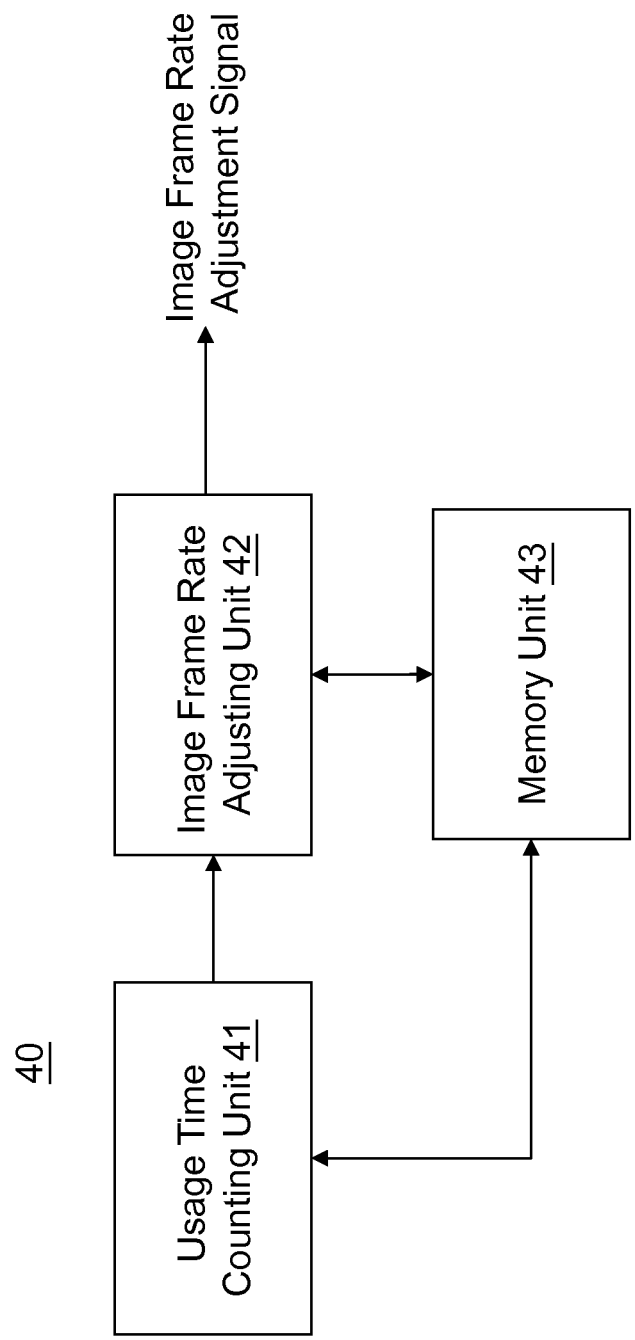
FIG. 4 shows another preferable embodiment of the device for dynamically adjusting image frame rate according to the present invention.

FIG. 4 shows a device 40 for dynamically adjusting image frame rate according to another perspective of the present invention, which includes: a usage time counting unit 41, an image frame rate adjusting unit 42, and a memory unit 43. The usage time counting unit 41 counts a usage time of a reference block, wherein the reference block is for comparison with an image to determine a displacement. The image frame rate adjusting unit 42 receives the usage time and generates an image frame rate adjustment signal according to aforementioned steps shown in FIG. 2A or 2B, to dynamically adjust the image frame rate. The memory unit 43 stores or temporarily stores the usage time, the accumulated counts, the threshold time values, and the criterion values.

The device 30 or 40 can be an independent device external to the image sensing device, or integrated with the image sensing device in one same device, depending on practical need.

In a preferable embodiment of the present invention, when the usage time is between the first threshold time value and the second threshold time value, the image frame rate adjusting unit 42 does not generate the image frame rate adjustment signal and does not accumulate a count.

The present invention has been described in considerable detail with reference to certain preferred embodiments thereof. It should be understood that the description is for illustrative purpose, not for limiting the scope of the present invention. An embodiment or a claim of the present invention does not need to attain or include all the objectives, advantages or features described in the above. The abstract and the title are provided for assisting searches and not to be read as limitations to the scope of the present invention. Those skilled in this art can readily conceive variations and modifications within the spirit of the present invention. For example, the terms "sequentially" and "next" are used to indicate a sequence between an earlier image or step and a later image or step, but do not mean that the later image or step must immediately follow the earlier image or step; for example, there can be another image or step in between. For another example, there are two or four "reference values" or "reference time values" in the aforementioned embodiments, but the number of these "reference values" or "reference time values" can be modified, and other "reference values" or "reference time values" can be added. Therefore, the present invention should cover all such and other modifications and variations, which should be interpreted to fall within the scope of the following claims and their equivalents.

What is claimed is:

1. A method of dynamically adjusting an image frame rate, comprising:
   (A) obtaining a displacement;
   (B) comparing the displacement with a first threshold value; when the displacement is higher than the first threshold value, accumulating a first count of a number of times that the displacement is higher than the first threshold value; and increasing an image frame rate in a first scale when the first count is larger than a non-zero first reference value; and
   (C) comparing the displacement with a second threshold value; when the displacement is lower than the second threshold value, accumulating a second count of a number of times that the displacement is lower than the second threshold value; and reducing the image frame rate in a second scale when the second count is larger than a non-zero second reference value,
   wherein the step (B) and the step (C) are performed in any order or in parallel with each other.

2. The method of claim 1, further comprising:
   repeating the step (A) through the step (C).

3. The method of claim 1, further comprising: not adjusting the image frame rate when the displacement is between the first threshold value and the second threshold value, wherein the first threshold value is higher than the second threshold value.

4. The method of claim 1, further comprising: not increasing the image frame rate when the image frame rate reaches an upper limit; or not reducing the image frame rate when the image frame rate reaches a lower limit.

5. The method of claim 1, further comprising:
   resetting the first count of the step (B) to zero when the displacement is not higher than the first threshold value; or
   resetting the second count of the step (C) to zero when the displacement is not lower than the second threshold value.

6. The method of claim 1, further comprising:
   comparing the displacement with a third threshold value; when the displacement is higher than the third threshold value, accumulating a third count of a number of times that the displacement is higher than the third threshold value; and increasing the image frame rate in a third scale when the third count is larger than a third reference value, wherein the third threshold value is lower than the first threshold value and the third scale is lower than the first scale.

7. The method of claim 1, further comprising:
   comparing the displacement with a fourth threshold value; when the displacement is lower than the fourth threshold value, accumulating a fourth count of a number of times that the displacement is lower than the fourth threshold value; and reducing the image frame rate in a fourth scale when the fourth count is larger than a fourth reference value, wherein the fourth threshold value is higher than the second threshold value and the fourth scale is lower than the second scale.

8. A device for dynamically adjusting an image frame rate, comprising:
   a displacement calculation unit, for sequentially receiving a plurality of images and calculating a plurality of displacements according to the images;
   an image frame rate adjusting unit, for receiving the displacements and generating an image frame rate adjustment signal according to the steps of:
      comparing the displacement with a first threshold value;
      when the displacement is higher than the first threshold value, accumulating a first count of a number of times that the displacement is higher than the first threshold value;
      increasing an image frame rate in a first scale when the first count is larger than a non-zero first reference value;
      comparing the displacement with a second threshold value;
      when the displacement is lower than the second threshold value, accumulating a second count of a number of times that the displacement is lower than the second threshold value; and
      reducing the image frame rate in a second scale when the second count is larger than a non-zero second reference value; and
   a memory unit, for storing at least one of the following data: the displacements, the accumulated counts, the threshold values, and the reference values.

9. The device of claim 8, wherein the image frame rate adjusting unit further performs the steps of:
   comparing the displacement with a third threshold value;
   when the displacement is higher than the third threshold value, accumulating a third count of a number of times that the displacement is higher than the third threshold value;
   increasing the image frame rate in a third scale when the third count is larger than a third reference value, wherein the third threshold value is lower than the first threshold value and the third scale is lower than the first scale;
   comparing the displacement with a fourth threshold value;
   when the displacement is lower than the fourth threshold value, accumulating a fourth count of a number of times that the displacement is lower than the fourth threshold value; and
   reducing the image frame rate in a fourth scale when the fourth count is larger than a fourth reference value, wherein the fourth threshold value is higher than the second threshold value and the fourth scale is lower than the second scale.

10. The device of claim 8, wherein the image frame rate adjusting unit further performs the step of:
resetting the first count to zero when the displacement is not higher than the first threshold value; or
resetting the second count to zero when the displacement is not lower than the second threshold value.

11. The device of claim 8, wherein the image frame rate adjusting unit does not increase the image frame rate when the image frame rate reaches an upper limit; or the image frame rate adjusting unit does not reduce the image frame rate when the image frame rate reaches a lower limit.

12. A method of dynamically adjusting image frame rate, comprising:
(A) obtaining a usage time of a reference block, wherein the reference block is used for comparison with an image to determine a displacement;
(B) comparing the usage time with a first threshold time value; when the usage time is higher than the first threshold time value, accumulating a first count of a number of times that the usage time is higher than the first threshold time value; and reducing an image frame rate in a first scale when the first count is larger than a non-zero first criterion value; and
(C) comparing the usage time with a second threshold time value; when the usage time is lower than the second threshold time value, accumulating a second count of a number of times that the usage time is lower than the second threshold time value; and increasing the image frame rate in a second scale when the second count is larger than a non-zero second criterion value,
wherein the step (B) and the step (C) are performed in any order or in parallel with each other.

13. The method of claim 12, further comprising:
repeating the step (A) through the step (C).

14. The method of claim 12, further comprising: not adjusting the image frame rate when the usage time is between the first threshold time value and the second threshold time value, wherein the first threshold time value is higher than the second threshold time value.

15. The method of claim 12, further comprising: not increasing the image frame rate when the image frame rate reaches an upper limit; or not reducing the image frame rate when the image frame rate reaches a lower limit.

16. The method of claim 12, further comprising:
resetting the first count of the step (B) to zero when the usage time is not higher than the first threshold time value; or
resetting the second count of the step (C) to zero when the usage time is not lower than the second threshold value.

17. The method of claim 12, further comprising:
comparing the usage time with a third threshold time value;
when the usage time is higher than the third threshold time value, accumulating a third count of a number of times that the usage time is higher than the third threshold time value; and reducing the image frame rate in a third scale when the third count is larger than a third criterion value, wherein the third threshold time value is lower than the first threshold time value and the third scale is lower than the first scale.

18. The method of claim 12, further comprising:
comparing the usage time with a fourth threshold time value; when the usage time is lower than the fourth threshold time value, accumulating a fourth count of a number of times that the usage time is lower than the fourth threshold time value; and increasing the image frame rate in a fourth scale when the fourth count is larger than a fourth criterion value, wherein the fourth threshold time value is higher than the second threshold value and the fourth scale is lower than the second scale.

19. A device for dynamically adjusting image frame rate, comprising:
a usage time counting unit, for counting a usage time of a reference block, wherein the reference block is used for comparison with an image to determine a displacement;
an image frame rate adjusting unit, for receiving the usage time and generating an image frame rate adjustment signal according to the steps of:
comparing the usage time with a first threshold time value;
when the usage time is higher than the first threshold time value, accumulating a first count of a number of times that the usage time is higher than the first threshold time value;
reducing an image frame rate in a first scale when the first count is larger than a non-zero first criterion value;
comparing the usage time with a second threshold time value;
when the usage time is lower than the second threshold time value, accumulating a second count of a number of times that the usage time is lower than the second threshold time value; and
increasing the image frame rate in a second scale when the second count is larger than a non-zero second criterion value; and
a memory unit, for storing at least one of the following data:
the usage time, the accumulated counts, the threshold time values, and the criterion values.

20. The device of claim 19, wherein the image frame rate adjusting unit further performs the steps of:
comparing the usage time with a third threshold time value;
when the usage time is higher than the third threshold time value, accumulating a third count of a number of times that the usage time is higher than the third threshold time value;
reducing the image frame rate in a third scale when the third count is larger than a third criterion value, wherein the third threshold time value is lower than the first threshold time value and the third scale is lower than the first scale;
comparing the usage time with a fourth threshold time value;
when the usage time is lower than the fourth threshold time value, accumulating a fourth count of a number of times that the usage time is lower than the fourth threshold time value; and
increasing the image frame rate in a fourth scale when the fourth count is larger than a fourth criterion value, wherein the fourth threshold time value is higher than the second threshold value and the fourth scale is lower than the second scale.

21. The device of claim 19, wherein the image frame rate adjusting unit further performs the step of:
resetting the first count to zero when the usage time is not higher than the first threshold time value; or
resetting the second count to zero when the usage time is not lower than the second threshold value.

22. The device of claim 19, wherein the image frame rate adjusting unit does not increase the image frame rate when the image frame rate reaches an upper limit; or the image frame rate adjusting unit does not reduce the image frame rate when the image frame rate reaches a lower limit.

* * * * *